United States Patent [19]
Bott et al.

[11] Patent Number: 5,137,935
[45] Date of Patent: Aug. 11, 1992

[54] POLYETHERPOLYCARBONATEDIOLS

[75] Inventors: Kaspar Bott, Mannheim; Wolfgang Straehle, Heidelberg; Ulrich Abel, Waldsee, all of Fed. Rep. of Germany

[73] Assignee: BASF Aktiengesellschaft, Ludwigshafen, Fed. Rep. of Germany

[21] Appl. No.: 655,833

[22] Filed: Feb. 15, 1991

[30] Foreign Application Priority Data

Feb. 16, 1990 [DE] Fed. Rep. of Germany ....... 4004882

[51] Int. Cl.$^5$ .............................................. C08G 18/14
[52] U.S. Cl. .................................... 521/172; 521/173; 525/467; 528/76; 528/370; 528/372
[58] Field of Search ................. 521/172, 173; 525/467; 528/76, 370, 372

[56] References Cited

U.S. PATENT DOCUMENTS 4,463,141  7/1984  Robinson ............................ 525/467

FOREIGN PATENT DOCUMENTS 0335416  4/1989  European Pat. Off. .
2726416  12/1978  Fed. Rep. of Germany .

*Primary Examiner*—Maurice J. Welsh
*Attorney, Agent, or Firm*—Oblon, Spivak, McClelland, Maier & Neustadt

[57] ABSTRACT

Polyetherpolycarbonatediols are composed essentially of

A) from 3 to 63.7 mol % of units derived from a polyoxytetramethylenediol,

B) from 63.7 to 3 mol % of units derived from a polyoxy-$C_2$–$C_8$-alkylenediol other than A), an aliphatic alkanediol of from 2 to 14 carbon atoms, an alicyclic alkanediol of from 3 to 14 carbon atoms or an alkylene oxide of 2 to 3 carbon atoms, or a mixture thereof, and C) from 33.3 to 50 mol % of units derived from phosgene, a dialkyl carbonate having $C_1$–$C_4$-alkyl groups or a cyclic carbonate having $C_2$–$C_4$-alkylene bridges, or a mixture thereof.

10 Claims, No Drawings

POLYETHERPOLYCARBONATEDIOLS

The present invention relates to polyetherpolycarbonatediols composed essentially of
- A) from 3 to 63.7 mol % of units derived from a polyoxytetramethylenediol,
- B) from 63.7 to 3 mol % of units derived from a polyoxy-$C_2$–$C_8$-alkylenediol other than A), an aliphatic alkanediol of from 2 to 14 carbon atoms, an alicyclic alkanediol of from 3 to 14 carbon atoms or an alkylene oxide of 2 or 3 carbon atoms, or a mixture thereof, and
- C) from 33.3 to 50 mol % of units derived from phosgene, a dialkyl carbonate having $C_1$–$C_4$-alkyl groups or a cyclic carbonate having $C_2$–$C_4$-alkylene bridges, or a mixture thereof.

The present invention also relates to the use of the polyetherpolycarbonatediols for producing thermoplastic polyurethanes, polyetheresters, polyetheramides, cellular polyurethane elastomers, casting elastomers and fibers and also to the thermoplastic polyurethanes, polyetheresters, polyetheramides, cellular polyurethane elastomers, casting elastomers and fibers produced using the polyetherpolycarbonatediols as diol component.

Polyetherpolycarbonatediols are used in particular in the production of thermoplastic polyurethanes.

U.S. Pat. No. 4,463,141 and EP-A-335 416 described polyoxytetramethylenediols which have been modified with carbonate groups and the preparation thereof. Polyetherpolycarbonatediols having aromatic structural units are known from DE-A-2 726 416. The mechanical and optical properties of the products produced from these compounds, however, are not fully satisfactory.

It is an object of the present invention to provide polyetherpolycarbonatediols from which thermoplastic polyurethanes, polyetheresters, polyetheramides, cellular polyurethane elastomers, casting elastomers and fibers having overall a more satisfactory range of properties can be produced.

We have found that this object is achieved by the polyetherpolycarbonatediols defined at the beginning. We have also found a method of using the polyetherpolycarbonatediols for producing thermoplastic polyurethanes, polyetheresters, polyetheramides, cellular polyurethane elastomers (DE-C-913 474), casting elastomers and fibers, and also the thermoplastic polyurethanes, polyetheresters, polyetheramides, cellular polyurethane elastomers, casting elastomers and fibers produced using said polyetherpolycarbonatediols as diol component.

The polyoxytetramethylenediols (also called polytetrahydrofurans or polyoxytetramethylene ether glycols) used as component A) can be prepared in a conventional manner by catalytic polymerization of tetrahydrofuran. They have in general an average molecular weight $M_n$ (number average) of from 150 to 5,000, preferably from 200 to 2,900.

The proportion of units derived from component A) is from 3 to 63.7 mol %, preferably from 20 to 50 mol %.

Suitable components B) are polyoxyalkylenediols other than A) which have $C_2$–$C_8$-alkylene groups, in particular $C_2$–$C_4$-alkylene groups. Polyoxytetramethylenediols which have a number average molecular weight $M_n$ different from that of component A) are preferred. Linear and branched alkanediols of from 2 to 14 carbon atoms, in particular ethanediol, 1,3-propanediol, 1,2-propanediol, 1,4-butanediol, 1,3-butanediol, 1,5-pentanediol, 1,6-hexanediol, 1,7-heptanediol and 1,8-octanediol, are particularly suitable. Of the cycloaliphatic diols of from 3 to 14 carbon atoms, the unsubstituted and $C_1$–$C_4$-alkyl-substituted 5- and 6-membered rings are particularly suitable, preference being given to dihydroxycyclohexane and 1,4-dihydroxymethylcyclohexane. It is also possible to use ethylene oxide and propylene oxide and also mixtures of compounds usable as component B).

The units derived from component B) are used in the preparation of polyetherpolycarbonatediols according to the present invention in amounts of from 63.7 to 3 mol %, preferably in amounts of from 50 to 20 mol %.

Preferred components C) are dialkyl carbonates having $C_1$–$C_4$-alkyl groups, in particular dimethyl carbonate, diethyl carbonate and dipropyl carbonate. Of the cyclic carbonates having $C_2$–$C_4$-alkylene bridges, preference is given to ethylene carbonate, 1,2-propylene carbonate and 1,3-propylene carbonate. It is also possible to use phosgene and mixtures of the components mentioned as component C).

The polyetherpolycarbonatediols according to the present invention contain the units derived from component C) in amounts of from 33.3 to 50 mol %, in particular in amounts of from 40 to 50 mol %.

It is to be noted that, depending on the nature of the carbonate used, the composition of the monomer mixture used does not always foreshadow the composition of the polyetherpolycarbonatediol. In some cases, some of the carbonate used is lost in the course of the reaction, so that it must be used in larger amounts. In the case of phosgene the excess depends on how much phosgene is driven out together with the hydrochloric acid formed and in the particularly preferred case of dialkyl carbonates on whether or not the carbonate used forms an azeotrope with the alcohol produced in the course of the transesterification, in which case the excess is from 0.5 to 50 mol %, preferably from 5 to 35 mol %.

The reaction of components A) and B) with component C) is preferably carried out in the presence of a catalyst.

Suitable catalysts are the customary transesterification catalysts such as tetraisopropyl orthotitanate, dibutyltin oxide, dibutyltin dilaurate and zirconium(IV) acetylacetonate and also alkali metal alcoholates, for example sodium methoxide, potassium methoxide, sodium ethoxide and potassium ethoxide. The amount of catalyst is from 0.001 to 2%, preferably from 0.01 to 0.5%, based on the total amount of starting materials.

The reaction components are preferably heated together with the catalyst to the boil. In the case of dialkyl carbonates being used, the resulting alcohol or the azeotrope of carbonate and alcohol may be separated off by distillation. The reaction generally takes place at from 20° to 250° C., preferably at from 40° to 200° C. If phosgene is used, the reaction may be carried out at from 0° to 100° C., preferably at from 20° to 80° C. In this case the reaction mixture is preferably mixed with a base, for example pyridine or triethylamine, to neutralize the hydrochloric acid formed.

If an alkali metal alcoholate is used as catalyst, a reaction temperature of from 20° to 150° C. is preferred, in particular of from 40° to 80° C., and to separate off the catalyst it is neutralized with an acid such as phosphoric acid and the precipitated alkali metal salt of the acid in question is separated off.

If tetraisopropyl orthotitanate is used as catalyst, a reaction temperature of from 40° to 250° C. is preferred, in particular of from 100° to 200° C., and the excess catalyst may for example be deactivated after the reaction by the addition of phosphoric acid.

The reaction can be carried out under atmospheric pressure, under reduced pressure or under superatmospheric pressure. It is customary to reduce the pressure to 0.1–5 mbar toward the end of the reaction to remove the last traces of low boilers. The reaction has ended when there are no longer any low boilers passing over.

The resulting polyetherpolycarbonatediols have a number average molecular weight $M_n$ of from 200 to 12,000, in particular from 500 to 6,000.

The polyetherpolycarbonatediols according to the present invention are suitable in particular for use as diol component of the soft phase in the production of thermoplastic polyurethanes, polyetheresters, polyetheramides, cellular polyurethane elastomers, casting elastomers and fibers. Suitable methods for producing such polymers are known per se to the skilled worker and are described in the literature.

EXAMPLES 1 to 5

Preparation of polyetherpolycarbonatediols

Polyoxytetramethylenediol, component B) and diethyl carbonate were heated to the boil together with tetraisopropyl orthotitanate, while the ethanol formed was continuously distilled off from unconverted diethyl carbonate in a distillation column (25 cm fill level, packing: 5 mm V-steel mesh) under atmospheric pressure using a reflux ratio of 4:1. The reaction was carried out at 180° C. The pressure was reduced to 0.3 mbar (30 Pa) to remove the low boilers.

Component B) is 1,4-butanediol in Examples 1 and 2 and 1,6-hexanediol in Examples 3 to 5.

The determination of the OH number and of the number average molecular weight $M_n$ was carried out as follows:

The number average molecular weight $M_n$ was calculated from the OH number ($M_n = 112{,}200/\text{OH number}$). The OH number was determined by potentiometric titration using the phthalic anhydride method.

|  | Polyoxytetramethylenediol | | Component B) | | Diethyl carbonate | | Tetraisopropyl orthotitanate | | Polyetherpolycarbonatediol Yield | | |
|---|---|---|---|---|---|---|---|---|---|---|---|
| Example | $M_n$ | g | mol | g | mol | g | mol | g | g | OH no. | $\overline{M}_n$ |
| 1 | 242 | 1625.0 | 6.7 | 585 | 6.5 | 1450.0 | 12.3 | 1.83 | 2498.0 | 61 | 1839 |
| 2 | 242 | 2100.0 | 8.7 | 252 | 2.8 | 1214.0 | 10.3 | 1.80 | 2592.5 | 69 | 1626 |
| 3 | 242 | 1500.0 | 6.2 | 708 | 6.0 | 1335.9 | 11.3 | 1.80 | 2498.6 | 60 | 1870 |
| 4 | 242 | 937.5 | 3.9 | 1180 | 10.0 | 1548.7 | 13.1 | 1.80 | 2454.0 | 55 | 2040 |
| 5 | 649 | 1950.0 | 3.0 | 767 | 6.5 | 1025.0 | 8.7 | 1.90 | 2930.6 | 57 | 1968 |

Examples 1 and 2: Component B): 1,5-butanediol
Examples 3 to 5: Component B): 1,6-hexanediol

We claim:
1. A polyetherpolycarbonatediol composed essentially of
   A) from 3 to 63.7 mol % of units from a polyoxytetramethylenediol,
   B) from 63.7 to 3 mol % of units from polyoxy-$C_2$–$C_8$-alkylenediol other than A), aliphatic alkanediol of from 2 to 14 carbon atoms, alicyclic alkanediol of from 3 to 14 carbon atoms, alkylene oxide of 2 or 3 carbon atoms, or a mixture thereof, and
   C) from 33.3 to 50 mol % of units from phosgene, a dialkyl carbonate having $C_1$–$C_4$-alkyl groups, a cyclic carbonate having $C_2$–$C_4$-alkylene bridges, or a mixture thereof.

2. A polyetherpolycarbonatediol as claimed in claim 1, wherein component B) is an aliphatic diol of from 2 to 8 carbon atoms.

3. A polyetherpolycarbonatediol as claimed in claim 1, wherein component C) is a dialkyl carbonate having $C_1$–$C_3$-alkyl groups.

4. A polyetherpolycarbonatediol as claimed in claim 1, having an average molecular weight $M_n$ (number average) of from 200 to 12,000.

5. A thermoplastic polyurethane comprising units from a polyetherpolycarbonatediol as claimed in claim 1.

6. A polyetherester comprising units from a polyetherpolycarbonatediol as claimed in claim 1.

7. A polyetheramide comprising units from a polyetherpolycarbonatediol as claimed in claim 1.

8. A cellular polyurethane elastomer comprising units from a polyetherpolycarbonatediol as claimed in claim 1.

9. A casting elastomer comprising units from a polyetherpolycarbonatediol as claimed in claim 1.

10. A fiber comprising units from a polyetherpolycarbonatediol as claimed in claim 1.

* * * * *